(12) United States Patent
Johnson et al.

(10) Patent No.: US 9,135,623 B2
(45) Date of Patent: Sep. 15, 2015

(54) SYSTEM AND METHOD FOR INDEPENDENTLY AUTHORIZING AUXILIARY COMMUNICATION SERVICES

(71) Applicant: Securus Technologies, Inc., Dallas, TX (US)

(72) Inventors: Michelle Johnson, Richardson, TX (US); Stuart Rosenfield, Plano, TX (US); Richard Falcone, Sanbornville, NH (US)

(73) Assignee: Securus Technologies, Inc., Dallas, TX (US)

( * ) Notice: Subject to any disclaimer, the term of this patent is extended or adjusted under 35 U.S.C. 154(b) by 0 days.

(21) Appl. No.: 14/076,691

(22) Filed: Nov. 11, 2013

(65) Prior Publication Data

US 2014/0172709 A1 Jun. 19, 2014

Related U.S. Application Data

(60) Division of application No. 13/566,867, filed on Aug. 3, 2012, now Pat. No. 8,583,527, which is a division of application No. 11/750,075, filed on May 17, 2007, now Pat. No. 8,255,300, which is a continuation-in-part of application No. 10/135,883, filed on Apr. 29, 2002, now Pat. No. 7,698,182.

(51) Int. Cl.

| | |
|---|---|
| *G06Q 40/00* | (2012.01) |
| *H04M 15/00* | (2006.01) |
| *G06Q 20/40* | (2012.01) |
| *G06Q 30/02* | (2012.01) |
| *H04M 15/08* | (2006.01) |
| *H04M 17/00* | (2006.01) |

(52) U.S. Cl.
CPC ............... *G06Q 20/40* (2013.01); *G06Q 30/02* (2013.01); *H04M 15/00* (2013.01); *H04M 15/08* (2013.01); *H04M 15/47* (2013.01); *H04M 15/58* (2013.01); *H04M 15/83* (2013.01); *H04M 15/835* (2013.01); *H04M 15/8351* (2013.01); *H04M 15/84* (2013.01); *H04M 15/842* (2013.01); *H04M 15/85* (2013.01); *H04M 15/851* (2013.01); *H04M 15/852* (2013.01); *H04M 15/854* (2013.01); *H04M 15/858* (2013.01); *H04M 17/00* (2013.01); *H04M 2215/0148* (2013.01); *H04M 2215/0188* (2013.01); *H04M 2215/62* (2013.01); *H04M 2215/68* (2013.01); *H04M 2215/81* (2013.01); *H04M 2215/8104* (2013.01); *H04M 2215/815* (2013.01); *H04M 2215/8108* (2013.01); *H04M 2215/8129* (2013.01); *H04M 2215/8133* (2013.01); *H04M 2215/8154* (2013.01); *H04M 2215/8158* (2013.01); *H04M 2215/8166* (2013.01); *H04M 2215/8183* (2013.01)

(58) Field of Classification Search
CPC ........................................................ G06Q 40/00
USPC ................................... 705/38; 379/114.2–28
See application file for complete search history.

(56) References Cited

U.S. PATENT DOCUMENTS

| | | | | |
|---|---|---|---|---|
| 5,586,175 | A * | 12/1996 | Hogan et al. ............. | 379/114.14 |
| 6,639,977 | B1 * | 10/2003 | Swope et al. ............ | 379/114.21 |

(Continued)

OTHER PUBLICATIONS

Top Features of Inmate Telecom Systems Donna Rogers. Corrections Forum. Hicksville: May/Jun. 2004. vol. 13, Iss. 3; p. 34.*

*Primary Examiner* — William Rankins
(74) *Attorney, Agent, or Firm* — Fogarty, L.L.C.

(57) ABSTRACT

Systems and methods which determines the likelihood that a calling (or in some cases the called) user will pay for a particular auxiliary service are described. A system of an embodiment considers the user's credit risk and his/her propensity to pay, when deciding if the user is eligible for a particular auxiliary service. A methodology used for determining propensity to pay for an auxiliary service according to embodiments is independent from a determination of propensity to pay for a basic calling service. Thus, the criteria used, and the weight given to each criteria, for determining eligibility for auxiliary services can be different from the criteria and criteria weight used for basic communication connections.

9 Claims, 9 Drawing Sheets

(56) References Cited

U.S. PATENT DOCUMENTS

| | | | |
|---|---|---|---|
| 6,836,540 B2* | 12/2004 | Falcone et al. | 379/127.02 |
| 7,042,992 B1* | 5/2006 | Falcone et al. | 379/114.21 |
| 7,561,680 B1* | 7/2009 | Falcone et al. | 379/88.25 |
| 7,899,167 B1* | 3/2011 | Rae | 379/189 |
| 2002/0103899 A1* | 8/2002 | Hogan et al. | 709/224 |
| 2002/0194096 A1* | 12/2002 | Falcone et al. | 705/35 |
| 2003/0076940 A1* | 4/2003 | Manto | 379/114.05 |
| 2003/0198325 A1* | 10/2003 | Bayne | 379/114.21 |
| 2006/0245563 A1* | 11/2006 | Leonard | 379/114.2 |

\* cited by examiner

SYSTEM AND METHOD FOR INDEPENDENTLY AUTHORIZING AUXILIARY COMMUNICATION SERVICES

CROSS-REFERENCE TO RELATED APPLICATIONS

The present application is a divisional of U.S. patent application Ser. No. 13/566,867, entitled "SYSTEM AND METHOD FOR INDEPENDENTLY AUTHORIZING AUXILIARY COMMUNICATION SERVICES," filed Aug. 3, 2012, which is a divisional of U.S. patent application Ser. No. 11/750,075, entitled "SYSTEM AND METHOD FOR INDEPENDENTLY AUTHORIZING AUXILIARY COMMUNICATION SERVICES," filed May 17, 2007, which is a continuation-in-part of U.S. patent application Ser. No. 10/135,883, entitled "OPTIMIZING PROFITABILITY IN BUSINESS TRANSACTIONS," filed Apr. 29, 2002, which is incorporated herein by reference. Also incorporated by reference herein are U.S. patent application Ser. No. 10/190,315, entitled "SYSTEMS AND METHODS FOR OFFERING A SERVICE TO A PARTY ASSOCIATED WITH A BLOCKED CALL"; filed Jul. 2, 2002, U.S. patent application Ser. No. 10/640,505, entitled "SYSTEM AND METHOD FOR CALLED PARTY CONTROLLED MESSAGE DELIVERY," filed Aug. 13, 2003, U.S. patent application Ser. No. 10/947,986, entitled "OPTIMIZING PROFITABILITY IN BUSINESS TRANSACTIONS" filed Sep. 23, 2004, and U.S. patent application Ser. No. 11/562,829, entitled "OPTIMIZING PROFITABILITY IN BUSINESS TRANSACTIONS" filed Nov. 22, 2006.

TECHNICAL FIELD

This disclosure relates to communication systems and more particularly to communication systems used in incarceration situations for allowing calling users opportunities to use, and pay for, auxiliary services.

BACKGROUND OF THE INVENTION

Current communication systems often have messaging options, such as voice-mail capability. However, a problem exists when the calling party receives a no-answer situation. In the normal (non-incarceration) situation the call would rollover to a voicemail application. When the user is an incarcerated person, or when the user is calling an incarcerated person, payment for the call is often an issue. While a calling party may be willing to pay to talk to a person in real time, that same person may not wish to pay to leave a message. In some situations, billing for calls to and from incarcerated persons is handled through a LEC billing system and in other situations the billing is pre-paid. In some situations the calling party, depending upon pre-established credit, is post billed for calls on a bulk (weekly, monthly) basis.

In developing the present invention it was discovered that, when the call is terminated at a messaging service, instead of being completed in real-time, different payment options may be desirable and thus completion of such calls are problematic when the calling (or called) party is to be charged for leaving a message or for having other services performed.

In addition, it would be desirable to allow communication systems, particularly electronic messaging systems, involving incarcerated facilities to have access to auxiliary services, such as message printing, binding, paper selection, hand delivery, etc. Payment difficulties, as well as monitoring of messages, time or frequency limits for messages and the like prevent such systems from being deployed presently.

BRIEF SUMMARY OF THE INVENTION

The present invention is directed to systems and methods which determine the likelihood that a calling (or in some cases the called) user is able and/or will pay for a particular auxiliary service. The system considers the user's credit risk, his/her propensity to pay and/or other metrics indication of payment or collection risk, when deciding if the user is offered or is eligible for a particular auxiliary service. The methodology used for determining propensity to pay for an auxiliary service according to embodiments of the invention is independent from a determination of propensity to pay for a basic calling service. Thus, the criteria used, and the weight given to each criteria, for determining eligibility for auxiliary services can be different from the criteria and criteria weight used for basic communication connections.

In one embodiment, when a user encounters a busy or no-answer situation, the calling user is connected to an interactive voice response (IVR) system for beginning the voice messaging process. While the user is interacting with the IVR, the system in the background determines the user's credit risk, propensity for that user to pay for the message or other requested service, and/or other metrics of payment or collection risk. If collection risk is low enough, the propensity is high enough, and/or the other metrics analyzed are satisfactory (e.g., meet a predetermined threshold), the user may be given the option to confirm his/her desire to pay and the method of payment. After the user and the system agree upon payment methods, the user may be given the opportunity to leave a message (or access other auxiliary services).

According to embodiments of the invention, a user for which the foregoing analysis with respect to offering message or other auxiliary services may be the called party. For example, the calling system may itself record a message from a calling party for delivery to a called party which did not answer the attempted call, wherein the called party is to pay for the message service. Thus, the system of embodiments may make a determination that the user qualifies for one or more service (e.g., message delivery, "find-me, follow-me, call or message redirection, etc.) and thus allow a caller to leave a message or otherwise interact with an auxiliary services platform. When the called party is placed in contact with the system (e.g., by outbound messaging and/or when the user is next in communication using the system) the user may agree to pay and/or the payment method used to deliver or complete the auxiliary service (e.g., deliver a recorded message).

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

The present disclosure relates to communications, and more particularly, to systems and methods for independently authorizing auxiliary communication services, such as for example, voice-messages, printed electronic mail and the like. It is understood, however, that the following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1:
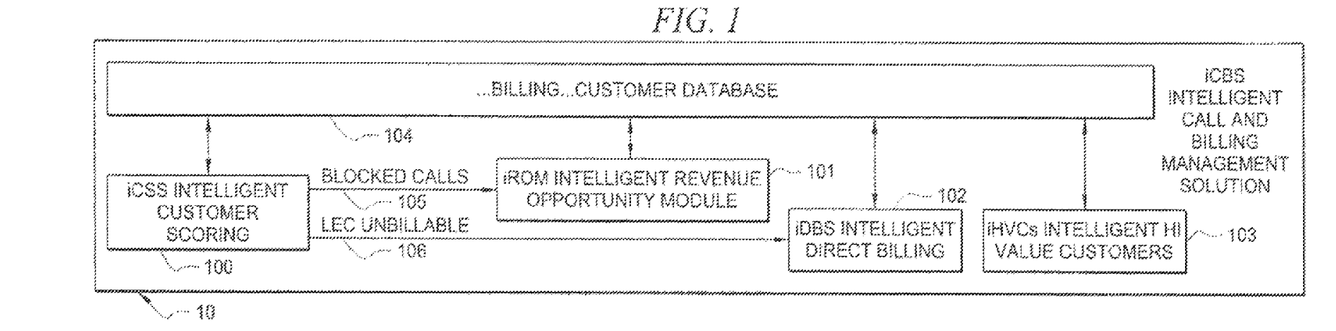
FIG. 1 is a high-level block diagram illustrating the main elements of one embodiment of the present invention.

Turning now to FIG. 1, intelligent call and billing management solution (iCBS) 10 comprises a multi-application system for optimizing and maximizing profitability of business transactions. ICBS 10 includes intelligent customer scoring system (iCSS) 100 for establishing a customer score, and intelligent revenue opportunity module (iROM) 101 for processing the customer score received from iCSS 100 to produce a recommended revenue opportunity application. The purpose behind the calculation of a customer score may vary from application to application. In some embodiments of the present invention, a customer score may represent a predicted risk management score used to authorize or deny requested transactions. In other embodiments, a customer score may represent a profitability value of that customer. ICBS 10 also includes intelligent direct billing system (iDBS) 102, associated with iROM 101, for selecting any one of a number of direct billing products for a customer responsive to customer score-based determinations made within iROM 101. In order to facilitate the calculations and predictive risk assessments made by iCSS 100, iCBS 10 also includes billing and customer database (BCD) 104. BCD 104 is generated as iCBS 10 continues interactions and completing transactions for customers of the business models. As more information is gathered with regard to the customer, it is stored in BCD 104 for future use and evaluation of the customer scores. BCD 104 is "local" to the prison telecommunication service provider, but may be physically located at the same facilities, different facilities, in a local area network (LAN), a wide area network (WAN), or other such network under the control or influence of the service provider.

It should be noted that in additional embodiments of the present invention, iCBS 10 may also incorporate intelligent high value customer service (iHVC) 103 for providing a variable and selective customer service options in which the selection of the level of service offered to a customer is made responsive to the customer score.

While the inventive elements of iCBS 10 are intended to be applicable to a wide variety of business models and business situations, the detailed description presented below of one embodiment of iCBS 10 will be specifically tailored to the example of a prison telecommunications service provider. Considering the specific example, as prisoners attempt to make out-going calls from the prison, or when a non-incarcerated user attempts to call an incarcerated user, the called phone number is received at iCBS 10 and processed by iCSS 100 for calculation of the customer score. The called, and, if necessary, the calling, number may be obtained in many different known ways, such as via dual tone, multiple frequency (DTMF) readers, via an Internet protocol (IP) network, via the signaling system 7 (SS7) network, or via dialed number identification service (DNIS) signals provided by the network.

If a particular called (or when appropriate, calling) number is not already in the service provider's customer database, the customer score that is preferably calculated by iCSS 100 will be an initial score based on the immediately available local information associated with the requested call and the called number. The telecommunication service provider compares the initial customer score against a preset risk threshold to determine which calls will be allowed and which calls will be blocked. If a call is blocked, a message may preferably be played to the inmate informing him or her of the reason why the call was blocked, or switching the inmate to an operator or interactive voice response (IVR) unit to make arrangements for the requested or future calls. An outgoing call may also preferably be placed by the IVR system to the blocked called party. The outgoing call preferably informs the called party that an inmate was attempting to reach the called party but was blocked, and offers the called party alternative products for arranging future calls from the inmate. The called party may also preferably be asked for additional or supplemental detailed information that may be used for refining the customer score. For example, the called party may be asked for their social security number, the length of time at their home/job, whether they rent or own, and the like. All of this information is preferably stored in BCD 104 for future use. For security purposes, the outgoing call may also preferably offer the called party an option to permanently block the called party's number from being called. Such circumstances may be necessary to thwart harassment of victims by the inmates.

In some situations, the calling connection, when not answered by a "live" person is sent to an auxiliary communication service, such as for example, a voice messaging system, whether a voice messaging system provided outside of the call control system (e.g., called party voice mail system) or a voice messaging system provided in association with the call control system (e.g., the message delivery system shown and described in the above referenced application entitled "System and Method for Called Party Controlled Message Delivery". In such a situation, since the parameters for determining "willingness" and/or propensity to pay for such an auxiliary service may be different from the willingness and/or propensity to pay for a live call, a new calculation is made according to embodiments to determine whether the call should proceed with an auxiliary communication service and if so what the billing and/or collection parameters will be. This new calculation is preferably made using the procedures outlined above however, one more of the criteria parameters used to determine willingness to pay may be changed.

In the prior art systems, the calls that required messaging services, were blocked because there was no assurance that the calling (or in some cases the called) party would be willing and/or able to pay for such services. However, in the described embodiment of the present invention, iROM 101 may preferably determine that it is indeed feasible to provide one or more services desired by the calling and/or called user, perhaps by changing the method of payment and/or the collection mechanism. ICBS 10 preferably communicates the called (or in some cases, the calling) numbers of calls requiring auxiliary services to iROM 101 for rating (or rerating) the related customer scores. An opportunity risk matrix (ORM) is established by the service provider identifying various service or billing plans aimed at optimizing profit opportunities for some of the blocked calls. The different risk levels found within the ORM may be lower than the threshold risk level associated with the real-time call authorization procedure. However, the varying levels are selected to correspond to the various customer scores (e.g., a higher risk customer score may be paired with a low-risk billing and collection method, while a low risk customer score may be associated with a higher risk billing and collection plan). As iROM 101 processes the customer score in comparison to the ORM levels through a software or hardware product or application comparator, a subset of possible revenue opportunity applications is identified as potentially available to the customers according to their respective customer scores. These possible call completion opportunities may either be presented to the customer for selection, or may be selected and implemented by the service provider directly.

In making this determination of possible revenue opportunity applications and products, parameters such as customer score or risk metric, the general length of the inmate's incarceration (which may preferably be obtained through deduction based on the prison unit from which the call originates, which, itself, may be deduced from the area code and prefix of the calling number, typically obtained from the automatic number identification (ANI) service), the potential profit margin available for the type of calls predicted (e.g., long distance vs. local or comparing average call costs vs. recovery margins for different geographic regions or comparing the available billable rates), the payment history of a particular customer or owner of the destination number, contractual obligations, commission agreements, governmental regulations, the type of transaction requested, costs for external validation, billing and collection (B&C) costs, rate revenue per call, the cost of the different billing products versus their economic benefits, and the like are considered. By weighing those and other parameters in the iT brain or system processor, iROM 101 preferably selects a variety of different payment products, which may include products such as standard post-paid products or prepaid products. They may also preferably determine a billing cycle, such as every 30 days, every two weeks, or even every few days depending on the customer score. They may also preferably determine the appropriate payment cycle, such as 30 days, two weeks, or a couple of days from receiving the bill. IROM 101 also preferably determines whether a direct billing product is necessary and/or desirable, or whether LEC billing product is acceptable. For LEC unbillable calls 106, a direct billing system would be desirable as the prison telecommunication service provider is not capable of billing that particular LEC without a billing arrangement.

As part of the general management functions performed by the inventive system, the transaction authorizations may take the form of a credit-type authorization, in which the customer would be limited to a certain monetary value of credit, or an entitlement-type authorization, in which the customer would be limited to a numerical, per-use entitlement. In administering either type of usage authorization system, the present invention intelligently sets the usage limit based on individual customer segmentation using the customer score and the additional information considered by iCBS 10 to manage the risk of the transaction.

Figure 2:
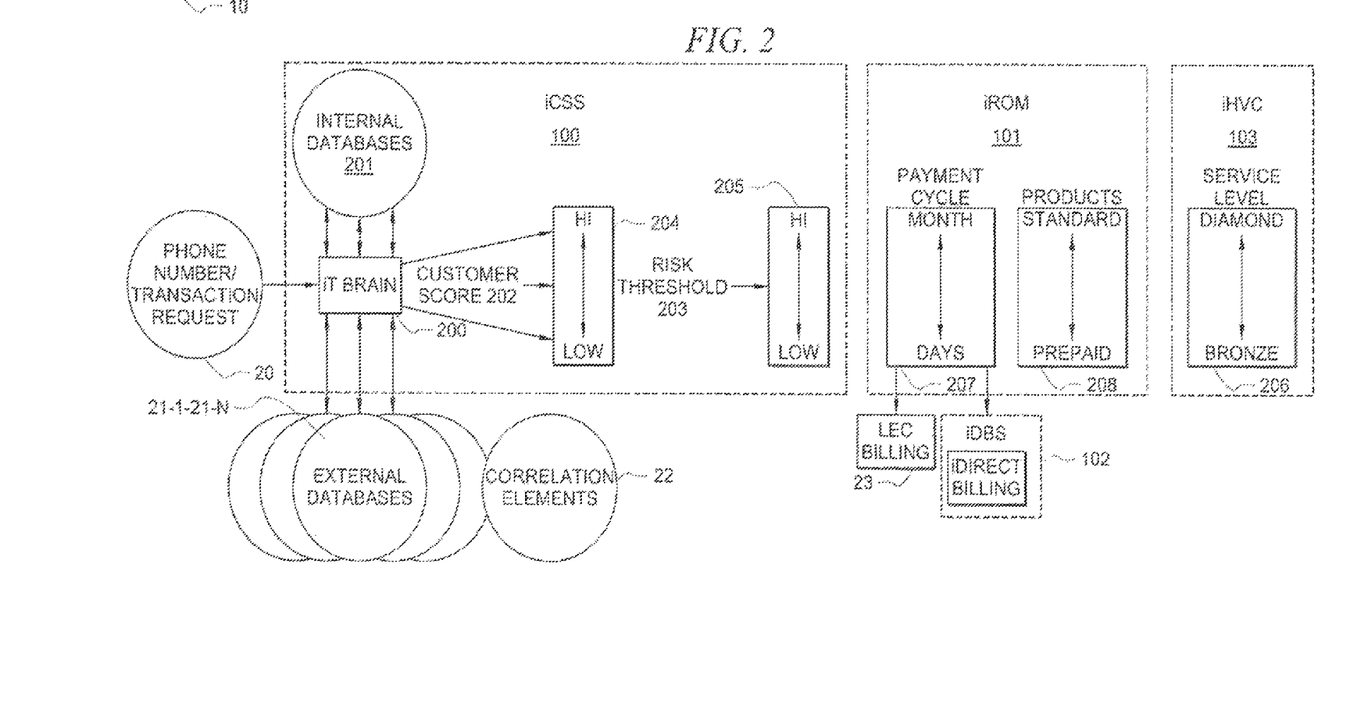
FIG. 2 is a high-level block diagram illustrating a more detailed view of the main elements of the embodiment shown in FIG. 1.

Turning now to FIG. 2, there is shown a high-level block diagram depicting a more detailed view of some of the elements of iCBS 10, as shown in FIG. 1. In an example operation of the described embodiment of the present invention as applied to a prison telecommunications provider, the elements of FIG. 2 illustrate the system configured to implement and execute the described embodiment. In operation, an inmate enters phone number/transaction request 20 into a prison phone, which requests the transaction of a collect call. Phone number/transaction request 20 is received by iCSS 100 and processed at intelligent targeting (iT) brain 200 to preferably determine a predictive risk level associated with phone number/transaction request 20.

Assuming, for purposes of this example, that phone number/transaction request 20 is the first transaction request for this particular called number, iT brain 200 preferably makes a real-time determination to authorize or block the requested call. To make the real-time authorization, iT brain 200 preferably accesses internal database 201 to find generic demographic information related to phone number/transaction request 20. By using generic and widely available demographic information, as correlated to phone number/transaction request 20, iT brain 200 preferably calculates the initial customer score for purposes of authorizing or blocking the initial collect call request. In additional embodiments, iT brain 200 may also initially access the local information which may provide accurate BNA information, the general length of the inmate's incarceration, the potential profit margin available for the type of calls requested, the payment history of a particular customer or owner of the destination number, contractual obligations, commission agreements, governmental regulations, the type of transaction requested, costs for external validation, B&C costs, rate revenue per call, rate of consumption, and the like. IT brain 200 may preferably cross-reference census data that has been associated with area codes and telephone number prefixes, by using the Bellcore/Telecordia area code system, the NPA/Nxx numbering system. The related census data may preferably be stored locally and used by iT brain 200 to find generalized income levels of persons residing in that geographic area, average home values of persons residing in that area, and, therefore, facilitate calculating an intelligent real-time customer score based solely on the use of the NPA/Nxx data.

After making its real-time determination based on the information gathered from internal database 201, iT brain 200 preferably assigns customer score 202 to phone number/ transaction request 20. Customer score 202 will typically reside within preset risk range 204. Depending on the system used by prison telecommunication provider, a high score may correlate to a low risk, high profitability transaction request, whereas a low score would represent a high risk, low profitability transaction request. It should be noted that other scoring systems with different representations of risk levels may also be used in preset risk range 204. Customer score 202 is then compared by iT brain 200 with risk threshold 203. Risk threshold 203 may also preferably be pre-selected by the prison telecommunication service provider on a sliding scale represented by threshold range 205. If the risk level associated with customer score 202 represents a better risk than risk threshold 203, iCSS 100 allows phone number/transaction requests 20 to be completed. However, if customer score 202 represents a higher risk value than risk threshold 203, phone number/transaction request 20 is denied or blocked.

After iT brain 200 makes the determination of whether to block or connect phone number/transaction request 20, it begins to refine customer score 202 by accessing external databases 21-1 through 21-N. The process of accessing external databases 21-1 through 21-N is sometimes referred to as data mining. IT brain 200 mines for data associated with phone number/transaction request 20 that would indicate a tendency for a low or high customer score. Such information may include payment histories for certain on-line vendors, in-service dates for the destination phone number, the type of dwelling that is serviced by the destination telephone number (i.e., whether the dwelling is a home or an apartment), accurate BNA information, and the like. IT brain 200 will preferably mine data in external databases 21-1 through 21-N and possibly find correlation elements 22 to correlate the data mined with the destination of phone number preferably within a period of time after the initial collect call being made.

After completion of the data mining process and evaluating all of correlation elements 22, iT brain 200 preferably recalculates a predictive risk management value and refines customer score 202 to phone number/transaction request 20. As opposed to the real-time determination represented by initial customer score 202, refined customer score 202 preferably represents a more accurate investigation and prediction into the customer score or predictive risk of the called party at phone number/transaction request 20. The eventual level of customer score 202 may preferably indicate to iCSS 100 that future calls should either be blocked or be turned over to iROM 101 for determination of a revenue opportunity product to be offered to the called party When a revenue opportunity product may be desirable, iCSS 100 preferably communicates customer score 202 to iROM 101 for determining appropriate revenue or profit opportunity products or applications to offer or select for the called party. IROM 101 examines customer score 202 and compares it to the ORM to select various payment and billing products according to cycle list 207 and product list 208. The service provider would either present the list of possible products to the customer for selection, or select the most desirable product automatically. For example, if phone number/transaction request 20 is serviced by a LEC which does not have a billing arrangement with the prison telecommunication service provider, yet its customer score 202 represents an extremely low risk and high profitability margin, iROM 101 may select to offer standard payment products, which include post-paid products billed directly by the service provider on a monthly payment cycle. These high-valued customers may also preferably warrant additional grace periods in which to make payments after the 30-day cycle. In contrast, if customer score 202 represents a higher risk value than risk threshold 203, but still offers a reasonable predictive risk of recovering revenue, iROM 101 may select to offer different prepaid calling packages to the called party at phone number/transaction request 20, including various denominations and accounts to pay for future or pending collect calls. Additional, if customer score 202 represents a high predictive risk, but still an acceptable level, instead of a prepaid product, a standard post-paid bill product may be offered. However, instead of providing for a 30 day billing cycle as with the lower risk customers, iROM 101 may select more frequent billing cycles, such as billing every three days, with a payment return time of three days. In this manner, the higher risk individuals will be billed more quickly and, if their payments are not received in the time allotted, their accounts may be blocked before further costs are expended completing calls that may not be paid for.

In conjunction with the revenue opportunity products offered by iROM 101, iDBS 102 adds direct billing methods to supplement the revenue opportunity products. For example, if phone number/transaction request 20 has a very low risk level in customer score 202, but, the destination number is served by a LEC which does not have a billing agreement with the prison telecommunication provider, iCBS, as depicted in FIG. 1, would still operate to optimize profits from such potential callers by implementing a direct billing scheme from iDBS 102, which sends bills directly to the called party to pay for collect calls made from the prison. Thus, while the prior art methods would simply block all such calls, the method described in this embodiment of the present invention, operate to optimize profits that would otherwise go unrealized. It should be noted that additional necessity for direct billing may generally arise when iROM 101 designates or selects billing and/or payment cycles of less than the standard 30 day periods. Because typical LECs do not bill in cycles less than 30 days, it would be required that the prison telecommunications provider bill those clients directly for the shortened billing and/or payment cycle. Alternatively, for low risk, high profit margin customers, standard billing through LEC billing 23 could be continued. The ultimate choice of billing products preferably results from a comparison of the cost and economic benefits for the different available products.

Additional embodiments of the present invention may also include iHVC 103 to provide customer services. Even though the specifically described example addresses issues involved in serving prisons, a considerable amount of revenue is still available in providing such telecommunication services to the prison and the prisoners' family communities. Thus, as in any other service oriented business, customer service and customer satisfaction is important in maintaining revenue and also increasing the recovery of revenue and ultimate firm profitability. With these goals in mind, iCBS 10, as depicted in FIG. 1, provides a system for offering variable levels of service to customers depending on the value of customer score 202. For example, average customers who pay a small amount on low margin accounts may be placed into a queue for an interactive voice response (IVR) system in order to access help applications or caller customer services. In contrast, highly valued customers with customer score 202 that represent very low predictive risk and very high profit margin, may be treated differently in the service center interactions. These higher valued customers may, for instance, be placed at the beginning of the queue to the IVR system. Alternatively, the higher valued customers may have a separate customer service access number to call that offers fewer and shorter waiting periods and possibly even more customer service opportunities. Even further, the highest valued customers may be directly connected to live operators in order to access the customer service system. In creating the different service levels in service level list 206, iCBS 10 (FIG. 1) operates to preserve and extend the possible revenue recovery from the highest valued customers, while at the same time providing incentive for the lower valued (i.e., higher predictive risk and lower profit margin) customers to increase their customer or profitability score to obtain higher levels of service.

Figure 3:
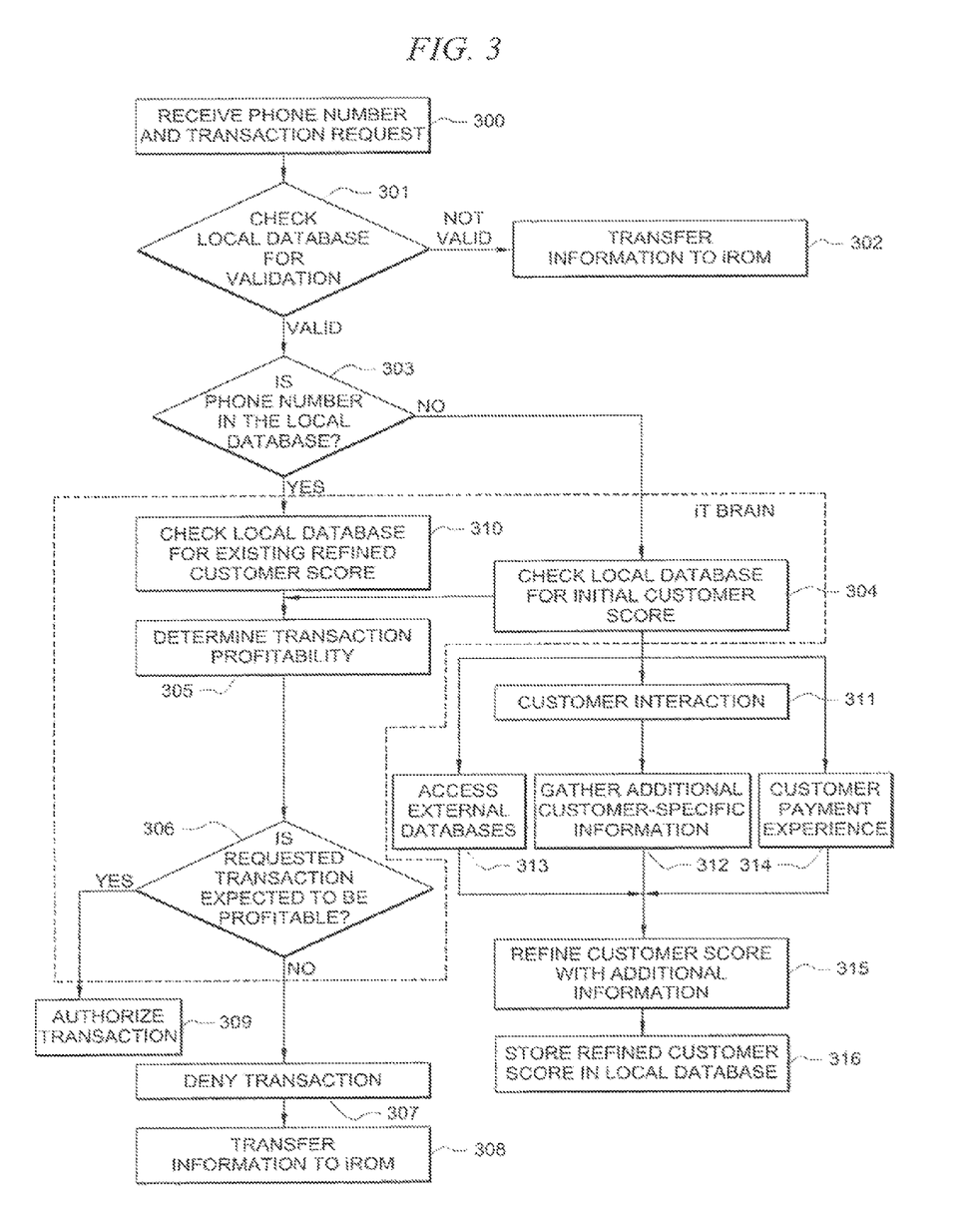
FIG. 3 is a flowchart illustrating steps that may be used to implement the intelligent customer scoring system used in the embodiment of the present invention shown in FIGS. 1 and 2.

FIG. 3 is a flow chart that illustrates the steps implemented in carrying out the function of the iCSS of the revenue optimizing system of the described embodiment of the present invention shown in FIGS. 1 and 2. In step 300, the iCSS receives a phone number and transaction request. The transaction request and/or related phone number may be an initial transaction request or may be a repeat transaction request. In step 301, the system checks the local database for validation (validation may comprise the verification that a billing mechanism is in place to bill the requested transaction). If the phone number cannot be validated, the information is forwarded to the iROM in step 302. In step 303, the local database is again checked for the telephone number. If the record of the phone number is not found in the local database, the system preferably checks for an initial customer score related to the telephone number in step 304. In step 305, the profitability of the transaction is determined. In step 306, using both the profitability information and the initial customer score, the system determines whether the requested transaction is expected to be profitable. If so, the transaction is authorized in step 309. If not, the transaction is denied in step 307 and then transferred to the iROM in step 308.

While the initial customer score is a value calculated in real-time to make a real-time determination to authorize or deny a requested transaction, the refined customer score is a more detailed prediction of risk or dependability level as performed over a longer amount of time and is also a more detailed review of information associated with the phone number. When an initial transaction request has been made, as the iCSS makes its real-time customer assessment, it also begins the process of predicting and determining the refined customer score for subsequent transaction requests. If the phone number is found in the local database in step 303, the database is checked for the existing refined customer score in step 310. The profitability of the transaction is determined in step 305, whereafter a determination is made in step 306 whether the requested transaction is expected to be profitable, based at least in part on the profitability information and the refined customer score. If it is expected to be profitable, the transaction is authorized in step 309. If not, the transaction is denied in step 307 and the information is transferred to the iROM in step 308.

If an initial customer score was calculated as a result of step 304, the system preferably accesses external databases in step 313, checks any customer payment experience in step 314, and gathers additional customer-specific information in step 312, after interacting with the customer in step 311. For example, during any outbound calls placed by the system's IVR units to the called party, the IVR applications prompt the called party for additional, useful identification and validation information. Alternatively, the information may be retrieved when the called party calls the service provide either with live, voice-to-voice or chat capabilities. Using this additional information, the initial customer score is preferably refined into the refined customer score in step 315. Refinement is a continuous process as new information is obtained.

Thereafter, the refined customer score is stored in the local database for future use in step 316. As shown in FIG. 3, the iT brain essentially performs the functions described in steps 304-306, and 310.

Figure 4:
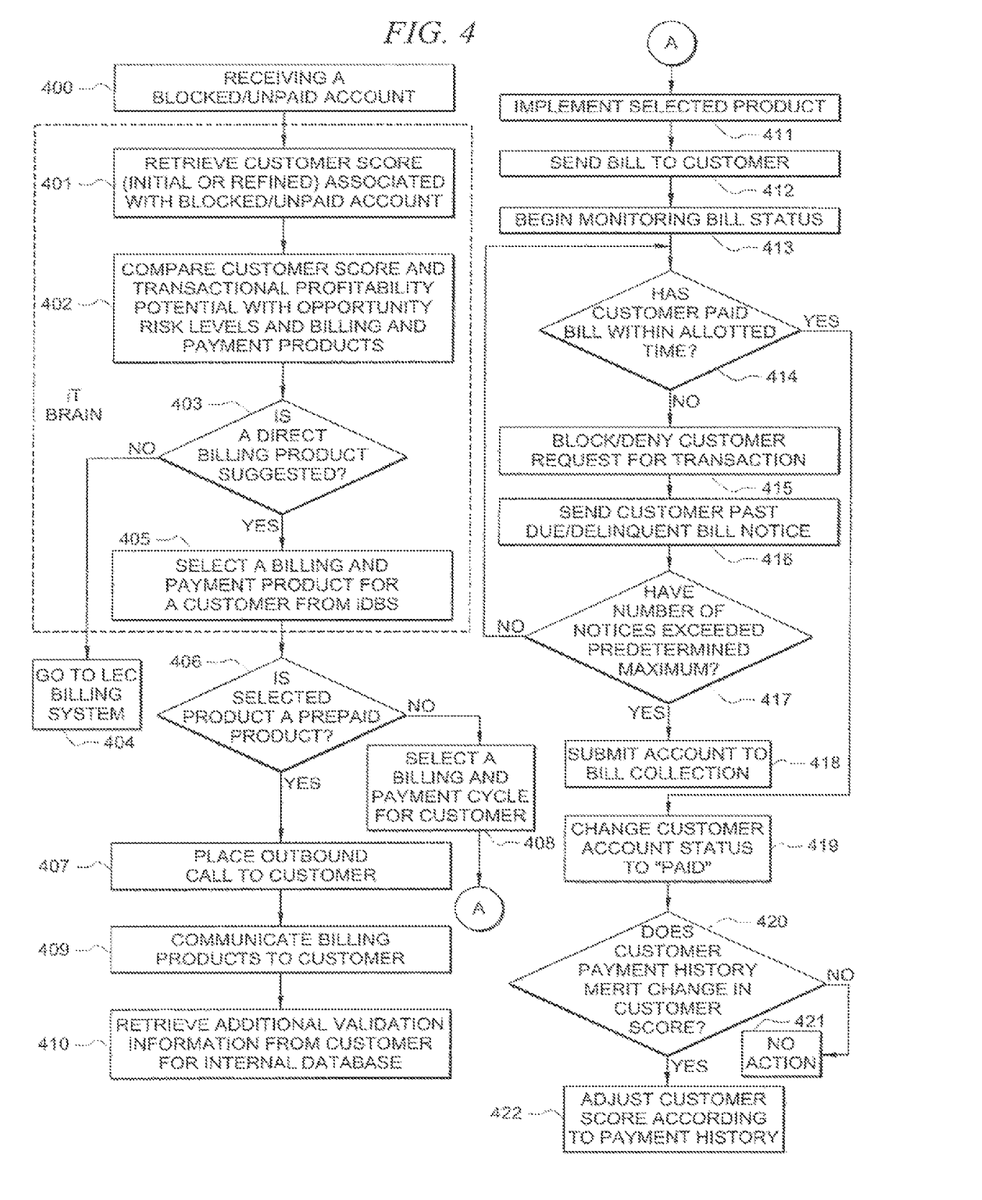
FIG. 4 is a flow chart that represents the steps of functional interaction between the iROM and the iDBS, as shown in FIGS. 1 and 2.

FIG. 4 is a flow chart that represents the steps of functional interaction between the iROM and the iDBS, as shown in FIGS. 1 and 2. The iROM is preferably accessed in response to the delivery of a particular customer score corresponding to a called telephone number or one or more different blocked calls in order to determine whether a revenue opportunity exists in providing one or more of the revenue opportunity products. In step 400, the iROM receives a blocked or unpaid account along with the telephone number associated with that account. Upon receipt of that blocked account, the iROM retrieves the customer score (either initial or refined) associated with that account in step 401. The iROM is generally implemented when blocked accounts are received; whether those blocked accounts are due to a bad debt or due to the destination numbers being serviced by a LEC without a billing arrangement with the prison communication provider. In step 402, the iROM preferably compares the customer number and the transaction profitability with the ORM to identify possible applicable revenue or profit generation applications and billing and payment products.

The iROM determines whether a direct billing product would be available or beneficial to the customer in step 403 based on its cost and economic benefits. If no direct billing product is suggested, then, in step 404, the iROM will pass the billing structure over to a standard third-party-billing-authority option, such as the LEC billing in the prison service provider example. If, on the other hand, it is determined that an appropriate direct billing product may be available from the iDBS, the iROM will identify and/or select a particular product or a set of possible products for a customer in step 405. In step 406, a determination is made whether the selected product or products are pre-paid products or post-paid products. If one or more of the selected products is a pre-paid product, the product is grouped for presentation to the customer in steps 407 and 408. If, however, the selected product includes a post-paid product, the iDBS, responsive to the customer score comparison, will select the appropriate variable billing cycle and/or variable payment cycle for the customer in step 408. The identified post-paid products may also be assembled with any of the identified prepaid products for presentation to the customer in steps 407 and 408. However, the in the described embodiment, the system will preferably automatically select the specific direct billing product that is most beneficial for profit optimization. In step 407, the system places an outbound call to the customer at the telephone number. During the call, the different identified prepaid and/or post-paid products are presented to the customer to select for facilitating future transactions in step 409. Additionally, in step 410, the system retrieves additional validation and/or identification data from the customer to supplement the information contained in the internal/local database. Upon receiving the product selection from the customer, the system will implement the selected product in step 411.

If a post-paid product is selected, the system sends the bill directly to the customer in step 412. Once the bill has been sent to the customer, the system preferably begins to monitor the bill status of the outstanding pending bill in step 413. As a part of the monitoring process, in step 414, the system determines whether the customer has fully paid the bill within the time allotted. If the customer has not fully paid the bill within the allotted time, the system preferably blocks or denies any future or pending requests of the customer in step 415. The iDBS preferably sends the customer a past due or delinquent notice in step 416. Depending on the number of past due or delinquent notices, as determined by step 417, the customer's account may either be submitted to a bill collection service in step 418, or passed back to the decision block of step 414 to determine whether the customer has paid the bill. As soon as the customer is detected to have paid the bill, the status on the customer's account is preferably changed to a "paid" status in step 419.

To maintain an accurate predictive risk management level or customer score, the iT brain may dynamically adjust the profitability or customer score associated with the customer. In step 420, in addition to gathering the additional information from both the internal and external databases, it is determined whether the specific payment history of the customer merits any change in the customer's related customer score. If no change is indicated, no action is taken in step 421. However, if an adjustment is merited according to the payment history, the system preferably recalculates or adjusts (i.e., refines) the customer score according to the customer's specific payment history in step 422. For example, if the customer has numerous delinquent notices, and/or numerous late payment notices, the system may preferably adjust the customer score to reflect a higher predictive risk associated with that customer. Conversely, if the customer has exhibited a good bill payment history over a period of time, the system may preferably adjust the customer score to reflect a lower predictive risk value for that customer. Thus, as the iT brain learns more about the payment characteristics of the customer, the customer's customer score or profitability level will preferably be adjusted accordingly to accurately reflect the level of profitability or predictive risk for the customer.

Figure 5:
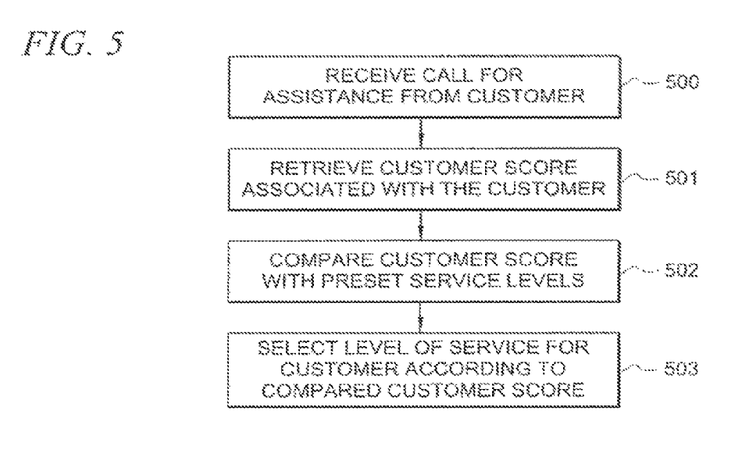
FIG. 5 is a flowchart illustrating steps that may be used to implement the intelligent high-value customer system used in the embodiment shown in FIGS. 1 and 2.

FIG. 5 is a flow chart that represents steps that may be implemented when executing the functions of the iHVC of the described embodiment of the present invention shown in FIGS. 1 and 2. In step 500, the iHVC will receive a call for assistance from a customer. The call may be placed to a customer call center, or some other IVR system that implements a customer service call center. Once the call has been received, the iHVC retrieves the customer score associated with the particular customer in step 501. In step 502, the customer score will be compared against the matrix of preset service levels. The iHVC will then select a particular level of service for the customer responsive to the compared customer score, in step 503. The resulting service provided to a customer will, therefore, vary according the customer's customer score.

It should be noted that the present invention is not limited to the described embodiment tailored for prison telecommunication service providers. Alternative embodiments of the present invention may be applied to other businesses as well. For example, remaining in the telecommunications industry, the collect call (i.e., 0+, 1-800-COLLECT, 1-800-CALL-ATT, etc.), 10-10-XXX long distance services, and the like may also implement the present invention to improve its capability for optimizing profitability. Outside of the telecommunication industry, credit and billing systems may be based on the present invention keying credit authorization and risk-dependent transactions on telephone numbers with variable billing and service procedures selectively tailored for the individual customer segment. Any system in which a telephone number may be used to designate the ultimately responsible party may implement various embodiments of the present invention.

Additionally, outside of the credit authorization sectors, call centers may be able to implement various embodiments of the present invention for selectively offering customer service to various callers based on the customer score for potential profitability. For instance, if a caller calls into a business call center, the customer score analysis may be performed to determine that the caller is likely a profitable potential customer. As a result of this customer score, the call center may direct the caller to a more personal calling experience to enhance the callers interaction with the call center.

When implemented in software, the elements of the present invention are essentially the code segments to perform the necessary tasks. The program or code segments can be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

Figure 6:
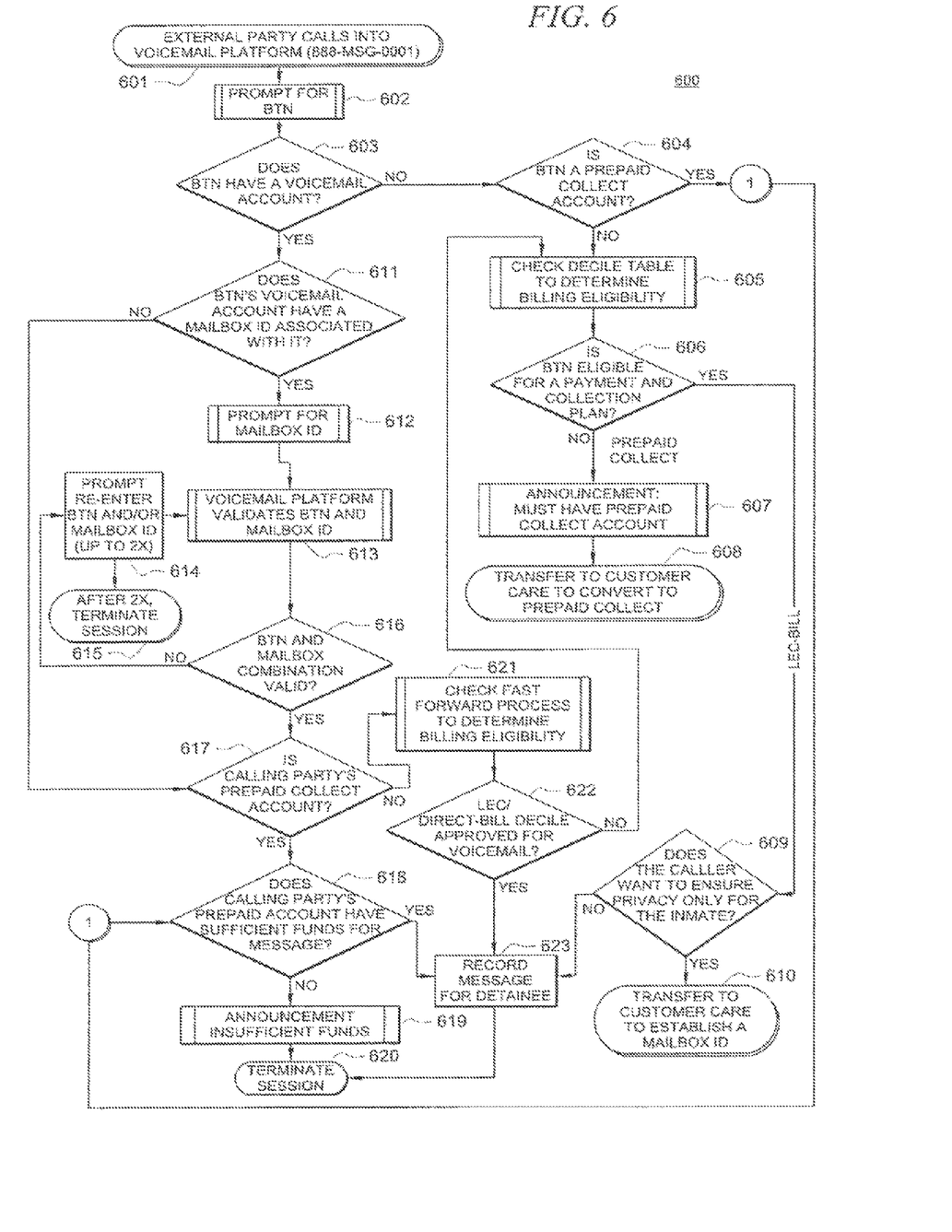
FIGS. 6 though 10 are embodiments of flow charts used to implement some of the features of the present inventive concepts.

FIGS. 6 though 10 are embodiments of flow charts used to implement some of the features of the present inventive concepts. FIG. 6 illustrates the situation that occurs when a non-incarcerated customer places a call for the purpose of leaving a message for an incarcerated person according to an embodiment of the invention. In this example, as shown in flow chart 600, the caller calls (process 601) a platform expressly for the purpose of leaving a message.

When the system detects a call incoming from a party, process 602 of the illustrated embodiment prompts for a billing telephone number (BTN), although embodiments may determine BTN or other information through other means (e.g., automatic number identification (ANI)). Process 603 determines if the detected BTN has already established a voice mail account. If it has not, then process 604 determines if the BTN is a prepaid collect account.

If it is a prepaid collect account, then process 618 determines if the prepaid account has sufficient funds. If so, process 623 records a message for the called party, which is in this case a detainee. If there are not sufficient funds in the account then process 619 prompts for either collecting more funds or terminating the session via process 620.

Returning now to process 603, if the billing telephone number has a voicemail account then process 611 determines if there is a voicemail mailbox identification associated therewith. If not, then process 617 determines if this party is a prepaid call account user. If it is, process 618 is involved according to the illustrated embodiment with respect to the call. If process 611 determines that there is a mailbox associated with the user (e.g., by referencing the BTN, account number, mailbox ID, user input, etc.), then process 612 determines what that mailbox ID is, process 613 validates the mailbox ID and process 616 determines if the BTN and mailbox combination are valid. If not, then process 614 of the illustrated embodiment prompts for the caller to reenter the information. If the ID continues to be invalid for a number of times, for example twice, then process 615 terminates the session. However, if the user information and mailbox combination are valid then process 617 determines if the calling party is a prepaid collect account and if it is then process 618, as discussed above, determines if there are enough funds in the account to allow a message to be recorded. On the other hand, if process 617 determines that it is not a prepaid account then process 621, as discussed above, determines the likelihood of payment and the payment method.

Process 622 of the illustrated embodiment determines if this is going to be an LEC/direct billed decile proved voicemail and if so, then process 605, working in conjunction with process 621 if necessary, determines the decile. Process 606 then determines if this BTN is eligible for a payment and collection plan using the foregoing decile and, if not, the user is sent to an announcement via processes 607 and 608 to setup prepaid collect accounts. If the BTN is eligible for a plan then process 609 is called upon to determine whether the caller wants to insure privacy for the called party or whether anybody can listen to the message. If privacy is required, process 610 sets up a mailbox with privacy features. If not, then process 623 records the message, as discussed above, for general delivery (e.g., anyone using a particular phone or other user terminal may be able to retrieve the message, such as by the user dialing the BTN associated with the message).

Figure 7:
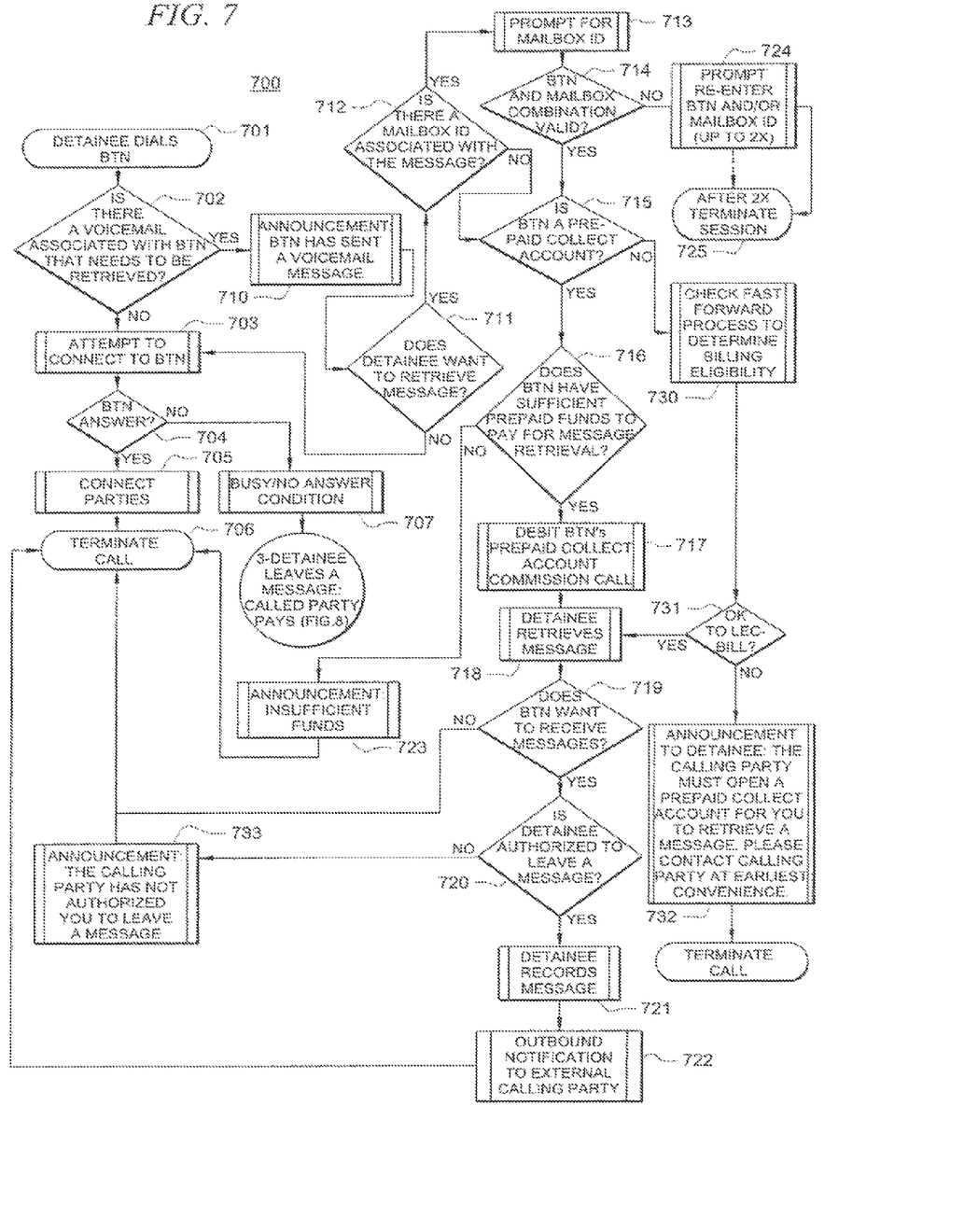

FIG. 7 illustrates one embodiment of flow chart 700 of a method when a detainee retrieves a message in which the called party pays for the message delivery service. This would occur, for example, when a detainee is attempting to receive a message left by his or her mom. In such a situation, in process 701 the detainee dials the billed telephone number (BTN) and process 702 determines if there is a voicemail associated with the BTN that needs to be reviewed. If not, then optionally the detainee via process 703 can attempt to contact the BTN and process 704 determines when the BTN, for example, the detainee's mom answers the call. If the call is answered, then process 704 connects the parties and process 706 supervises termination of the call at the appropriate time. Of course, if the called telephone number does not answer, process 704 operating in conjunction with process 707 supervises the no answer condition and optionally connects the detainee to the system for leaving messages as will be discussed with respect to FIG. 8.

Returning now to process 702, if there is a voicemail associated with a BTN then process 710 sends an announcement that there is a message and process 711 of the illustrated embodiment determines if the detainee wants to retrieve the message. If the detainee desires to retrieve the message, process 712 determines if there is a mailbox ID associated with the message. If there is, then process 713 of the illustrated embodiment obtains the mailbox ID from the detainee and process 704 determines if it is valid. Alternative embodiments may make a mailbox determination through different means, such as by referencing calling and/or called party information (e.g., inmate personal identification information (PIN)). Process 715 prompts to reenter invalid numbers, such as one or two or three times, and terminates the call if in fact there is no proper match. If there is a proper match, then process 715 determines if this is a prepaid collect account. If it is, then process 716 determines if there are sufficient funds in the account. It should be appreciated that although the embodiment of flow chart 600 in FIG. 6 verifies that sufficient funds are in an account prior to accepting the message for delivery, embodiments of the invention do not actually debit such funds until the message or other auxiliary service is performed. Accordingly, flow chart 700 of FIG. 7 again verifies the funds in the account to protect against a situation where the funds have been depleted after acceptance of the message but before delivery of the message. Alternative embodiments of the invention may debit the account (or debit the account for some portion of the auxiliary service fee) when the message is accepted.

If there are insufficient funds, in the account, process 723 announces to the detainee that there needs to be more funds available and the call is terminated or the detainee is presented with an opportunity to pay for the message through other means (e.g. the detainees prepaid account, such as a commissary account). However, if process 716 determines that there are sufficient funds, then process 717 debits the prepaid account and the detainee retrieves the message via process 718. If the detainee does not want to retrieve the message, then process 719 terminates the call or presents the detainee with other options. If the detainee wants to leave another message (e.g., a reply or return message), process 720 supervises such a situation. If the detainee is not authorized to leave a message, process 733 provides such an announcement. If the detainee is authorized to leave a message, process 721 records the message and process 722 optionally notifies an external party of the message. It should be appreciated that processes similar to these described above with respect to flow diagram 600 of FIG. 6 may be implemented with respect to the detainee leaving a message. For example, the above described processes for determining if an account has sufficient funds and/or if other payment methods are available may be implemented with respect to the detainee's message. Such funding options may be made with respect to the original caller (e.g., BTN) and/or the detainee (e.g., the detainee is to pay for the return message).

Returning now to process 715, if the BTN is not a prepaid collect amount then process 730, in the manner discussed above, checks for the likelihood of payment and the method of payment. Process 731 then controls the leaving or not leaving of a message in conjunction with process 732.

Figure 8:
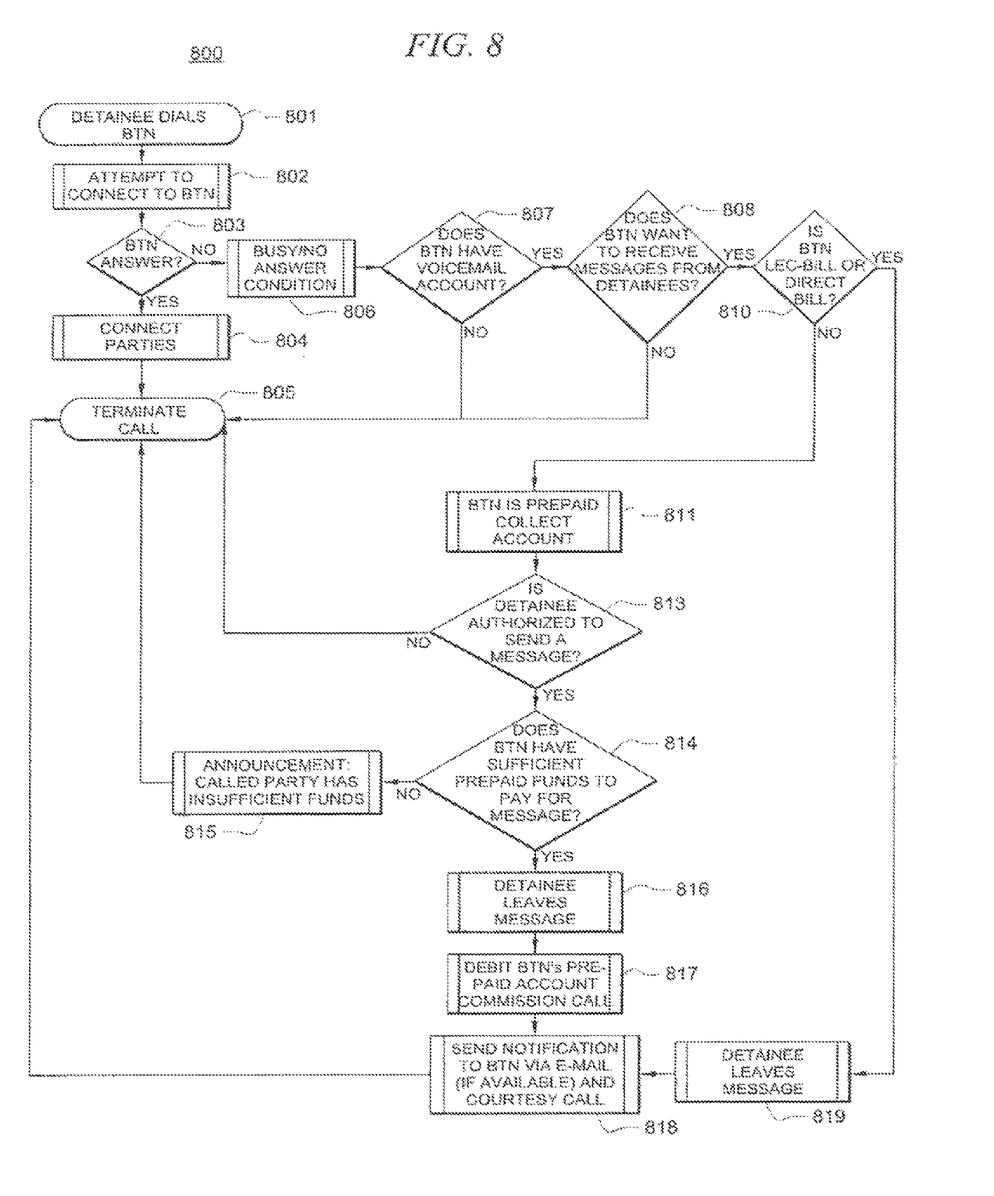

FIG. 8 shows an example flow chart 800 of the situation where a detainee leaves a message where a called party pays. This situation would occur, for example, when the detainee calls home and there is a busy (or no answer) situation and the detainee desires to leave a message. In this situation, the detainee via process 801 dials or otherwise calls the BTN. Process 802 supervises the connection to the BTN and process 803 determines if the BTN answers. If the BTN does answer, process 804 connects the parties in the well known manner. If there is no answer, process 806, in conjunction with process 807, determines if the called BTN has a voicemail account. If not, the call is terminated or optionally, if desired, an account can be setup for the detainee.

If there is an account, then a determination is made as to whether the BTN desires to receive messages from this detainee. If yes, then process 810 determines if this is a direct billed account. If it is, then the detainee leaves a message via process 819 and notification is sent to the BTN via process 818. However, if this is not a direct billed situation, then process 811 prepares to deal with the prepaid collect account. Process 813 determines if the detainee is authorized to send the message and if so, process 814 determines if the account has sufficient funds. If not, process 815 supervises the announcement of insufficient funds and either terminates the call or in some cases arranges with the user to provide more funds into the system. Process 816 allows the detainee to leave a message with process 817 deducting the proper amount from the BTN account. Process 818, as discussed, sends notification to the BTN that a message is available.

Figure 9:
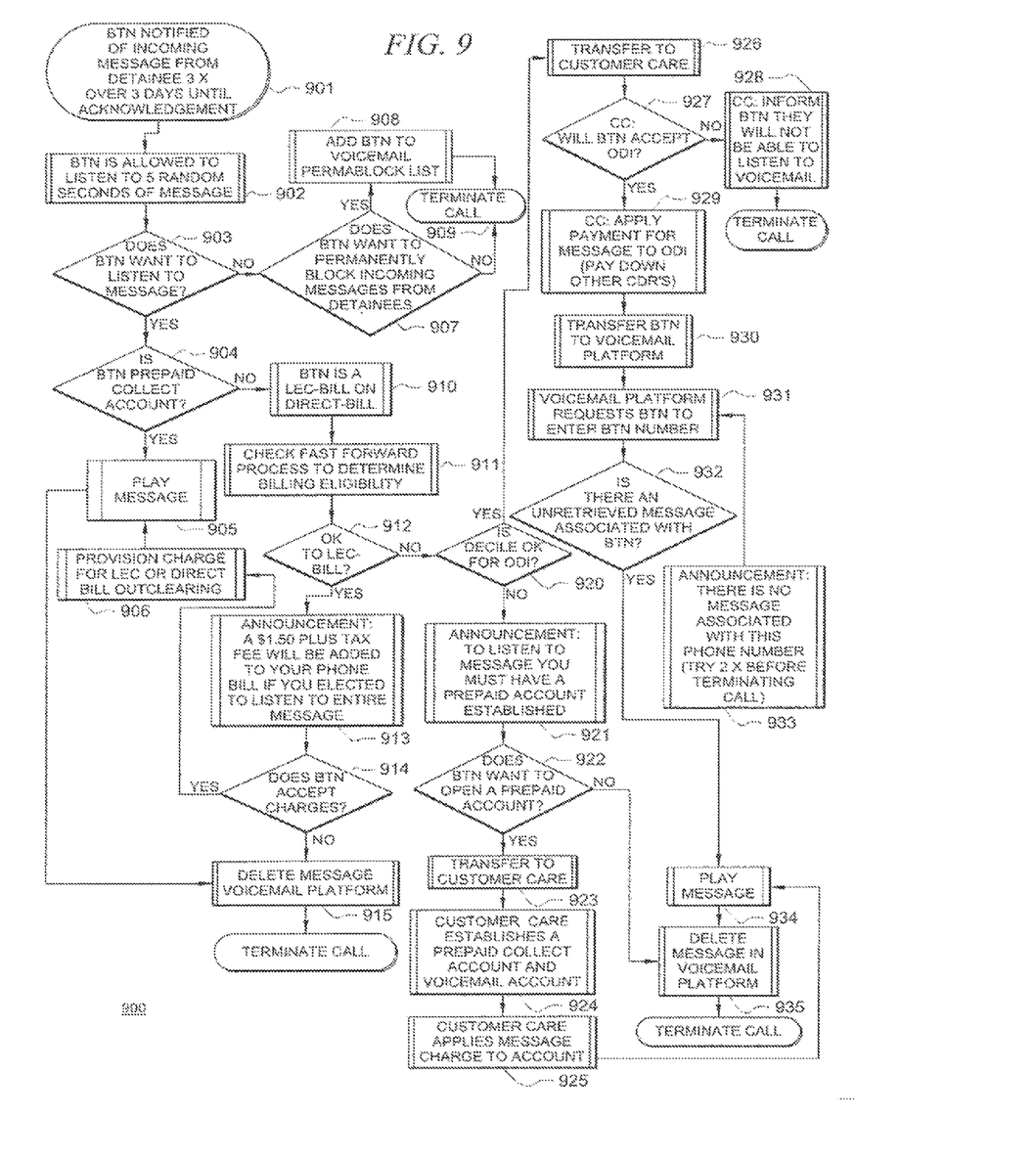

FIG. 9 shows one embodiment of flow chart 900 in which the calling party retrieves the message where the calling party pays. In such a situation, process 901 notifies the BTN of an incoming message from a detainee, such as through outbound calling, dial tone signaling, etc. This can be for a period of time, such as three days or three message or any other desired timing depending upon, for example, the amount of money being charged to the BTN on an account by account basis.

Process 902 allows, if desired, the BTN to listen to five random seconds of the message and process 903 determines if the BTN wants to then pay for and listen to the full message. If the BTN desires to listen to the message process 901 then determines the kind of account being used. If this is a prepaid account, then the prepaid processes are put in place, as discussed above. If it is not a prepaid account, then process 910 determines if it is a direct billed account. Process 911 quickly determines, based upon the eligibility factors and other decile factors as discussed above and processes 912, 913, 914 and 915 determine what type of process for billing will occur. In situations where it is decided that the user has a low likelihood of paying, then process 921 of the illustrated embodiment provides announcements to that affect and decides with process 922 if an account is to be opened. If an account is to be opened, then processes 923, 924 and 925 work with a customer care representative, an IVR platform, etc. to establish an account for the purposes of playing messages via process 934 and subsequently deleting messages via process 935 after the messages are played.

Returning to process 920, if the decile analysis is determined to be acceptable then processes 926, 927, 928, 929, 930, 931, 932 and 933 control the establishment of accounts for the retrieving of the message and eventually play the message via process 934.

Figure 10:
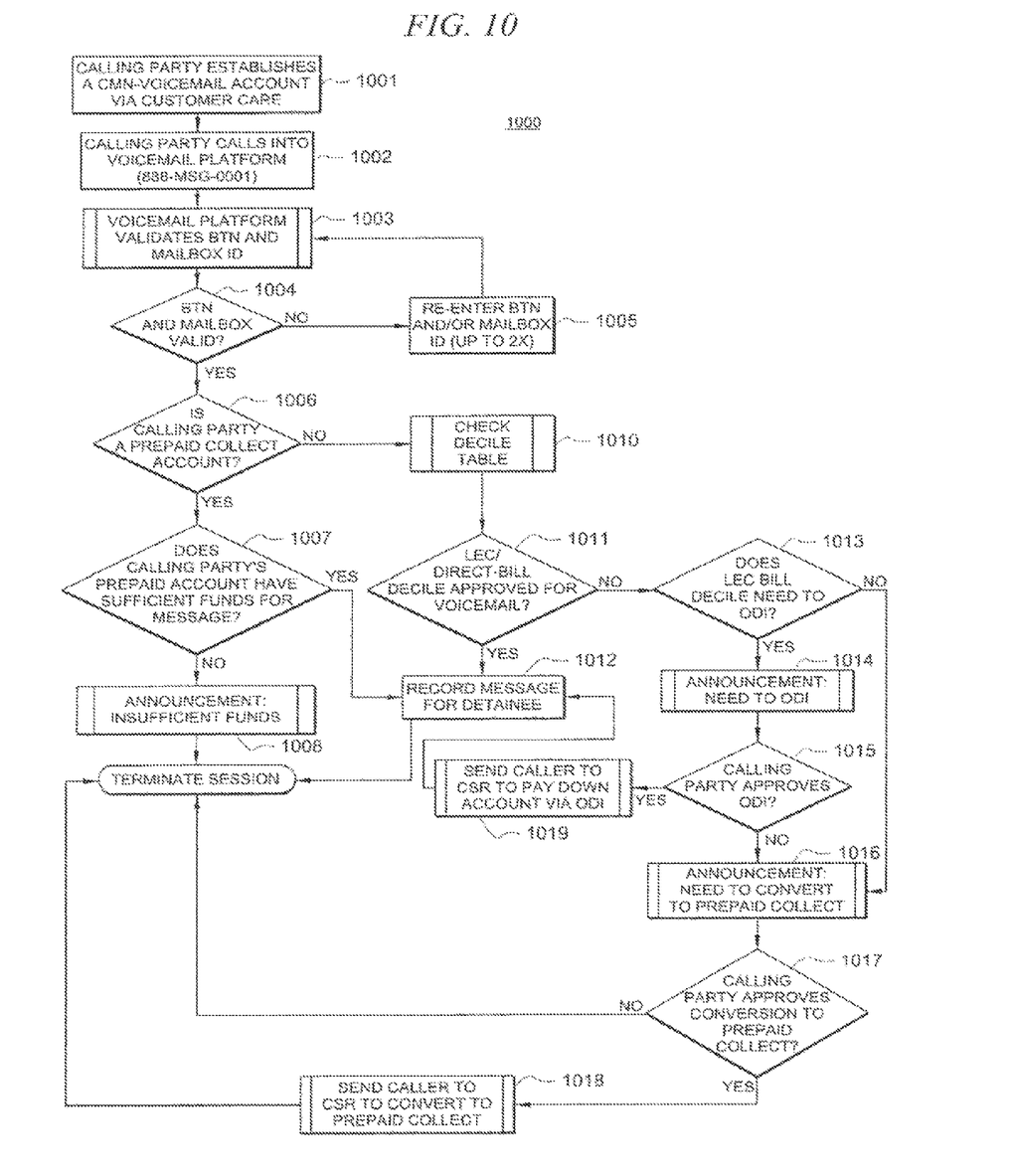

FIG. 10 shows one embodiment of flow chart 1000 in which inbound messages are recorded by calling parties who pay for those messages. Accordingly, process 1001 establishes a calling party voicemail account via a customer care representative, an IVR platform, etc. Process 1002 controls the inbound calling from a calling party to a voicemail platform. Process 1003 in conjunction with process 1004 determines if the mailbox is valid. If it is not, process 1005 allows the caller to reenter mailbox numbers, such as for one or two or three times, prior to terminating the call. If the mailbox number and the user information (e.g., (BTN)) are valid, then process 1006 determines if there is a prepaid account. If not, then process 1010 determines the decile level, as discussed above, for this caller at this time. Process 1001, in conjunction with processes 1013, 1014 and 1015 determine whether the user is able to leave a message. Processes 1019 and 1012 control the recording of the message for the detainee. If however, process 1007 determines that the prepaid account has insufficient funds then an announcement of insufficient funds is made via process 1008 and the call is terminated. In some situations the calling party, via process 1015, is determined not to have sufficient credit and therefore needs to convert to a prepaid account which is controlled by processes 1016, 1017 and 1018.

Note that in all cases where the detainee or the non-custodial person leaves a message the message could be any other service such as, for example, an email or direction to print a document, etc., all of which would have different charges associated therewith and therefore different algorithms determining their respective payment, if desired.

Figure 11:
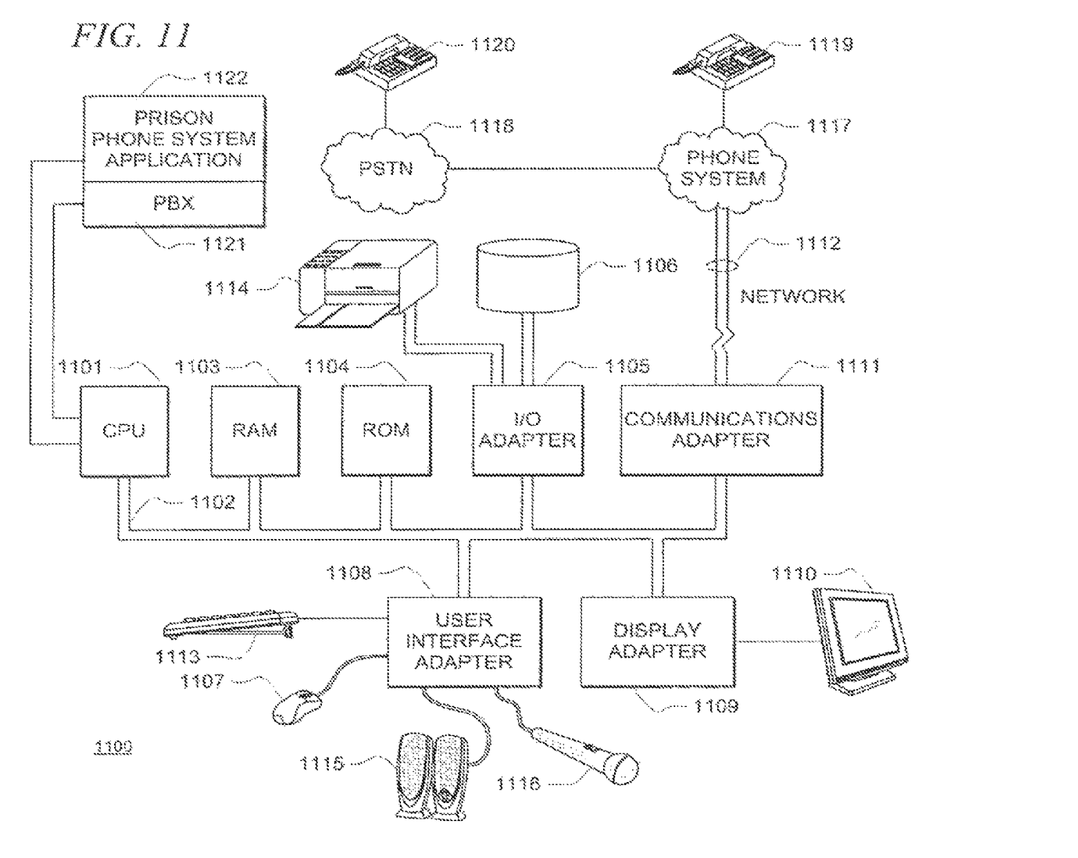
FIG. 11 depicts a block diagram of a computer system which is adapted to use the present invention.

FIG. 11 illustrates computer system 1100 adapted to use the present invention. Central processing unit (CPU) 1101 is coupled to system bus 1102. The CPU 1101 may be any general purpose CPU. However, the present invention is not restricted by the architecture of CPU 1101 as long as CPU 1101 supports the inventive operations as described herein. Bus 1102 is coupled to random access memory (RAM) 1103, which may be SRAM, DRAM, or SDRAM. ROM 1104 is also coupled to bus 1102, which may be PROM, EPROM, or EEPROM. RAM 1103 and ROM 1104 hold user and system data and programs as is well known in the art.

Bus 1102 is also coupled to input/output (I/O) controller card 1105, communications adapter card 1111, user interface card 1108, and display card 1109. The I/O adapter card 1105 connects to storage devices 1106, such as one or more of a hard drive, a CD drive, a floppy disk drive, a tape drive, to the computer system. The I/O adapter 1105 is also connected to printer 1111, which would allow the system to print paper copies of information such as document, photographs, articles, etc. Note that the printer may a printer (e.g. dot matrix, laser, etc.), a fax machine, or a copier machine. Communications card 1111 is adapted to couple the computer system 1100 to a network 1112, which may be one or more of a telephone network, a local (LAN) and/or a wide-area (WAN) network, an Ethernet network, and/or the Internet network. User interface card 1108 couples user input devices, such as keyboard 1113, pointing device 1107, and microphone 1116, to the computer system 1100. User interface card 1108 also provides sound output to a user via speaker(s) 1115. The display card 1109 is driven by CPU 1101 to control the display on display device 1110.

When operating any one or number of embodiments of the present invention as shown in FIGS. 1 & 2, and, in particular, the prison telecommunication service provider embodiment described herein, computer system 1100 preferably connects via network 1112 to phone system 1117, which is connected at some interface point to public switched telephone network (PSTN) 1118. Computer system 1100 preferably includes software applications, private branch exchange (PBX) 1121 and prison phone system application 1122, run from CPU 1101 to control all aspects of the present invention. As inmates attempt to call from phone 1119 to destination number/phone 1120, the embodiment of the present invention running on computer system 1100 facilitates the connection and the probabilities that the service provider will recover the cost and revenue related to that call.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:
1. A transaction authorization system, comprising:
at least one processor; and
a memory coupled to the at least one processor, the memory configured to store instructions executable by the at least one processor to cause the system to:
receive, via an authorization interface, one or more transaction requests from a user, the requests pertaining to a Billing Telephone Number (BTN);
assess, via a scoring module, for assessing a profitability score associated with at least one of: said BTN and said one or more transaction requests; and provide a transaction service to the user based upon the profitability score associated with the one or more transaction requests.

2. The transaction authorization system of claim 1, wherein the instructions are further executable by the at least one processor to cause the system to:

select, by a profit opportunity module, ones of a plurality of profit generation applications based at least in part on said profitability score.

3. The system of claim 1 wherein the transaction service is selected from the group consisting of: leaving a voice mail message, leaving an e-mail message, creating message copies, hand delivery of a message, private messages, retrieving a voicemail message, leaving a reply voicemail message in response to a retrieved voicemail message, and retrieving an e-mail message.

4. A method, comprising:

performing, by one or more computer systems:

receiving one or more transaction requests from a user, the requests pertaining to a Billing Telephone Number (BTN);

assessing a profitability score associated with at least one of: said BTN and said one or more transaction requests; and providing a transaction service to the user based upon the profitability score associated with the one or more transaction requests.

5. The method of claim 4, further comprising selecting ones of a plurality of profit generation applications based at least in part on said profitability score.

6. The method of claim 4, wherein the transaction service is selected from the group consisting of: leaving a voice mail message, leaving an e-mail message, creating message copies, hand delivery of a message, private messages, retrieving a voicemail message, leaving a reply voicemail message in response to a retrieved voicemail message, and retrieving an e-mail message.

7. A non-transitory computer readable medium having program instructions stored thereon that, upon execution by a computer system, cause the computer system to:

receive one or more transaction requests from a user, the requests pertaining to a Billing Telephone Number (BTN);

assess a profitability score associated with at least one of: said BTN and said one or more transaction requests; and provide a transaction service to the user based upon the profitability score associated with the one or more transaction requests.

8. The non-transitory computer readable medium of claim 7, wherein the program instructions, upon execution by the computer system, further cause the computer system to select ones of a plurality of profit generation applications based at least in part on said profitability score.

9. The non-transitory computer readable medium of claim 7, wherein the transaction service is selected from the group consisting of: leaving a voice mail message, leaving an e-mail message, creating message copies, hand delivery of a message, private messages, retrieving a voicemail message, leaving a reply voicemail message in response to a retrieved voicemail message, and retrieving an e-mail message.

* * * * *